(12) United States Patent
Croak et al.

(10) Patent No.: US 7,995,739 B1
(45) Date of Patent: Aug. 9, 2011

(54) METHOD AND APPARATUS FOR ENABLING INTERNATIONAL TOLL FREE CALLS USING PEERING ARRANGEMENTS

(75) Inventors: Marian Croak, Fair Haven, NJ (US); Hossein Eslambolchi, Los Altos Hills, CA (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1956 days.

(21) Appl. No.: 11/022,624

(22) Filed: Dec. 27, 2004

(51) Int. Cl.
*H04M 7/00* (2006.01)
*H04M 11/00* (2006.01)
*H04L 12/66* (2006.01)

(52) U.S. Cl. .............. 379/221.02; 379/88.17; 370/352

(58) Field of Classification Search .......... 370/352–356; 379/265.09, 265.11, 88.17, 220.01, 221.02
See application file for complete search history.

(56) References Cited

U.S. PATENT DOCUMENTS

| 5,875,237 | A  | * | 2/1999  | Bolinger Jr. et al. ...... 379/114.14 |
| 6,606,305 | B1 | * | 8/2003  | Boyle et al. .................... 370/260 |
| 7,313,133 | B2 | * | 12/2007 | Yarlagadda .................... 370/352 |
| 7,353,255 | B2 | * | 4/2008  | Acharya et al. ............... 709/204 |
| 2005/0141694 | A1 | * | 6/2005 | Wengrovitz ............. 379/265.09 |

* cited by examiner

*Primary Examiner* — Ahmad F Matar
*Assistant Examiner* — Nafiz E Hoque

(57) ABSTRACT

The present invention enables retailers who use toll free services provided by a VoIP network service provider to obtain peering arrangements with international and domestic VoIP carriers to originate, terminate, and bridge multiple call legs among global locations across peering partner carriers.

12 Claims, 5 Drawing Sheets

METHOD AND APPARATUS FOR ENABLING INTERNATIONAL TOLL FREE CALLS USING PEERING ARRANGEMENTS

The present invention relates generally to communication networks and, more particularly, to a method and apparatus for enabling international toll free calls using peering arrangements in packet switched networks, e.g., Voice over Internet Protocol (VoIP) networks.

BACKGROUND OF THE INVENTION

Call centers are increasingly dispersed globally. Frequently, agents of different call centers need to speak with each other as part of a multi-leg conference with the calling customer. Broadly defined, a call center is where calls are received or placed for the purposes of telemarketing, sales, customer support, or other business related activity. The customer may be in one country and each of the agents may be in different countries. Connecting these end points across the globe using Public Switch Telephone Network (PSTN) can become prohibitively expensive.

Therefore, a need exists for a method and apparatus for enabling international toll free calls using peering arrangements in packet-switched networks, e.g., Voice over Internet Protocol (VoIP) networks.

SUMMARY OF THE INVENTION

In one embodiment, the present invention enables subscribers, e.g., retailers who use toll free services provided by a VoIP network service provider to obtain peering arrangements with international and domestic VoIP carriers to originate, terminate, and bridge multiple call legs among global locations across peering partner carriers. Using the peering arrangements, the subscribers can significantly reduce cost in subscribing to the toll free services.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
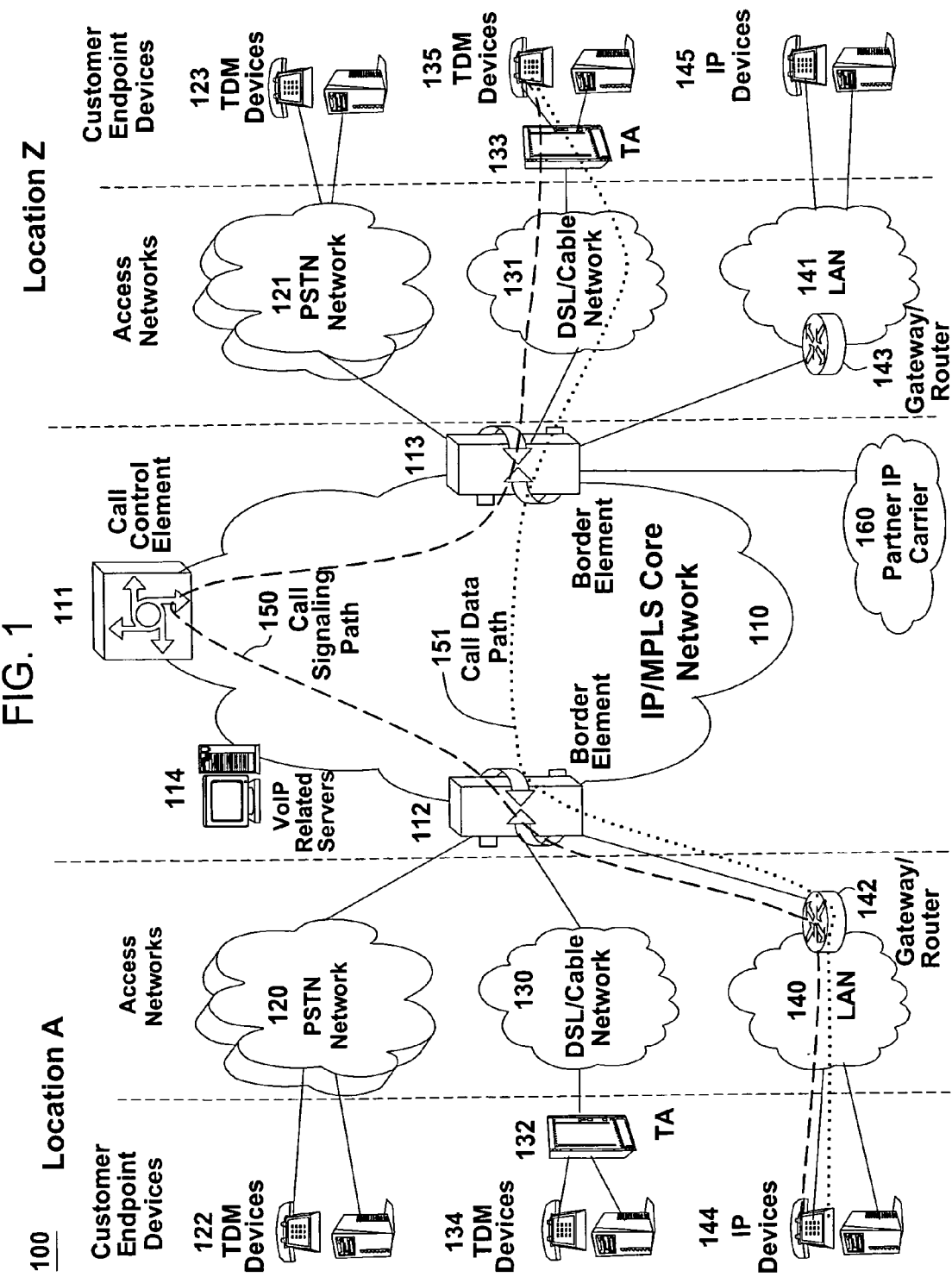
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Call centers are increasingly dispersed globally. Frequently, agents of different call centers need to speak with each other as part of a multi-leg conference with the calling customer. Broadly defined, a call center is where calls are received or placed for the purposes of telemarketing, sales, customer support, or other business related activity. The customer may be in one country and each of the agents may be in different countries. Connecting these end points across the globe using Public Switch Telephone Network (PSTN) can become prohibitively expensive.

To address this criticality, the present invention enables retailers who use toll free services provided by a VoIP network service provider to obtain peering arrangements with international and domestic VoIP carriers to originate, terminate, and bridge multiple call legs among global locations across peering partner carriers. Using the peering arrangements, the subscribers can significantly reduce cost in subscribing to the toll free services.

Figure 2:
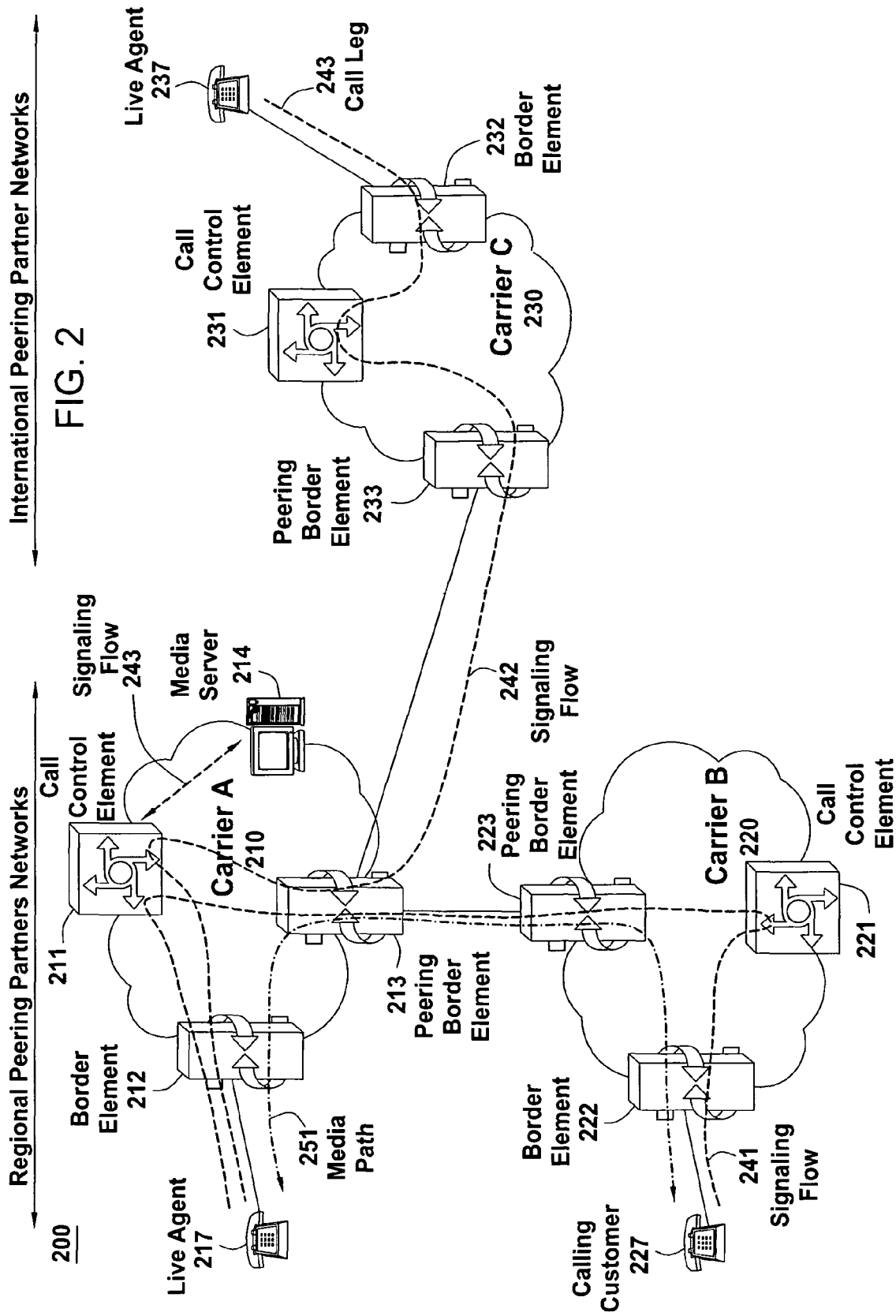
FIG. 2 illustrates an example of signaling flows for a multi-agent international toll free call using peering arrangements in a VoIP network of the present invention.

FIG. 2 illustrates an example of signaling flows for an international toll free call, e.g., a multi-agent international toll free call, using peering arrangements in a packet-switched network, e.g., a VoIP network. In FIG. 2 a subscriber has signed up for a toll free service with Carrier A to terminate toll free calls using Network 210. Carrier A has established IP peering arrangements with both Carrier B and Carrier C. Network 210, Carrier A, is connected to Network 220, Carrier B, via Peering Border Element (PBE) 213 and PBE 223. Network 210, Carrier A, is connected to Network 230, Carrier C, via Peering Border Element (PBE) 213 and PBE 233. A Peering Border Element is a Border Element that interconnects two VoIP carrier networks and serves as the point of interconnection for both signaling and media packets between the two VoIP carriers. Carriers A and B are located within the same country while Carriers A and C are located in different countries in the world. Carrier B is a domestic peering partner to Carrier A. Carrier C is an international peering partner to Carrier A.

A calling customer 227 calls the subscriber using signaling flow 241, and the call is routed via BE 222, PBE 223, PBE 213 and BE 212 and is terminated at live agent 217. Signaling flow 241 establishes a two-way call between the live agent 217 and the calling customer 227. The media path of the call is shown in flow 251. During the two-way call, live agent 217 decides that another live agent from a different country needs to be involved. Live agent 217 then signals the network to establish a three-way conference call by adding a call leg connecting live agent 237. The signaling flow 242 via BE 212, CCE 211, PBE 213, PBE 233, CCE 231 and BE 232 is used to add live agent onto a three-way conference call. Since a conference call involves the use of a conference bridge, CCE 211 also signals to Media Server (MS) 214 using signaling flow 243 to establish the bridge function to support the conference call. A Media Server (MS) is a special server that typically handles and terminates media streams, and to provide services such as announcements, bridges, transcoding, and Interactive Voice Response (IVR) messages.

Figure 3:
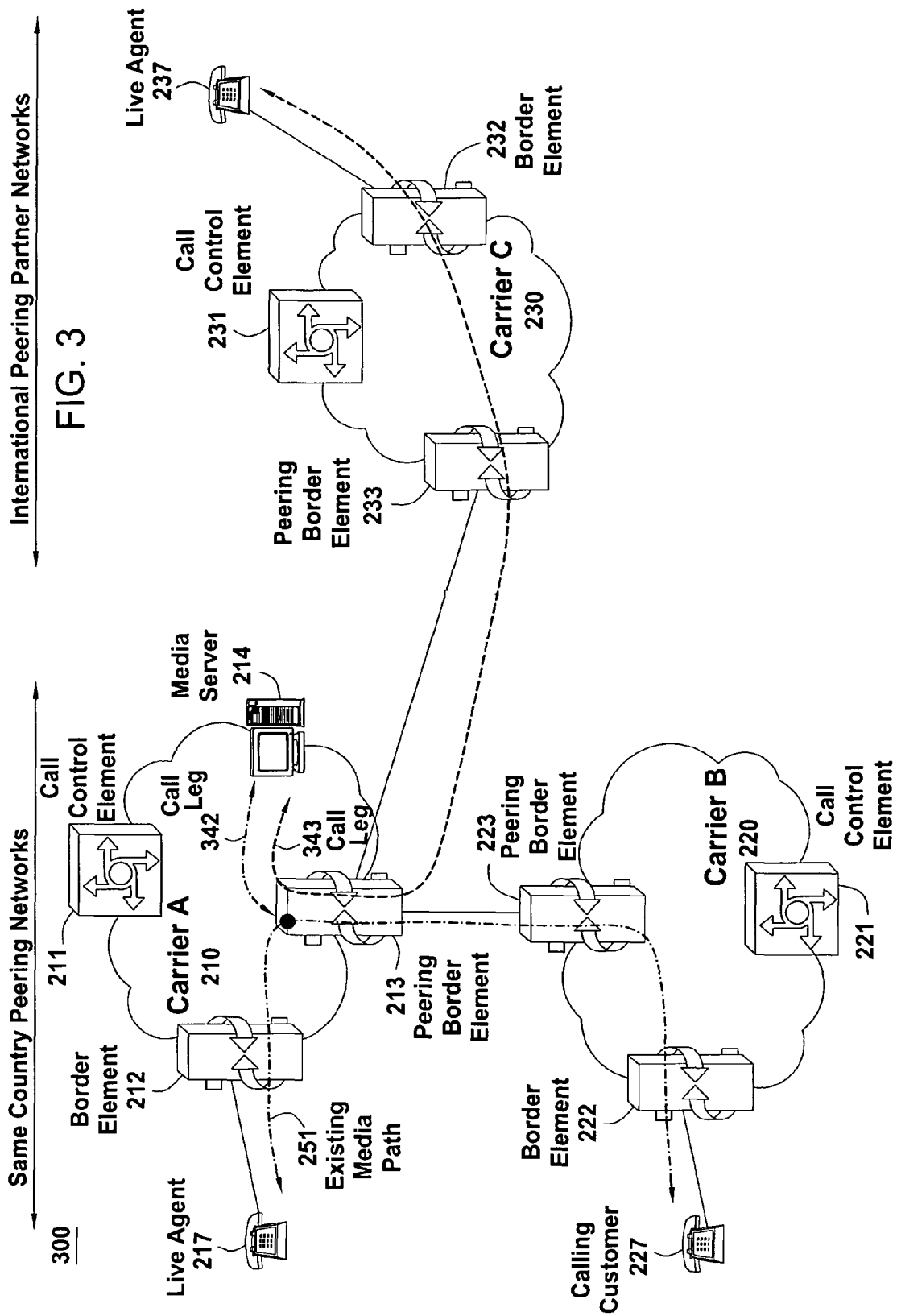
FIG. 3 illustrates an example of media paths for a multi-agent international toll free call using peering arrangements in a VoIP network of the present invention.

FIG. 3 illustrates an example of media paths for a multi-agent international toll free call using peering arrangements in a VoIP network. FIG. 3 shows the existing two way media path 251 connecting customer 227 and customer agent 217 and the added call legs 342 and 343 of the newly established three-way conference call as a result of live agent 217 adding live agent 237 onto the call. The three-way conference call bridges, via MS 214 and PBE 213, calling customer 227, live agent 217, and live agent 237 using existing media path 251, call leg 342, and call leg 343 respectively. Note that PBE 213 bridges the existing media path 251 to the newly established call leg 342 to facilitate the three way conference call so that the existing two way media path 251 does not need to be interrupted. Note also that all numberings of network elements shown in FIG. 2 is preserved in FIG. 3 to indicate the same network elements or network paths that are illustrated in both figures.

Figure 4:
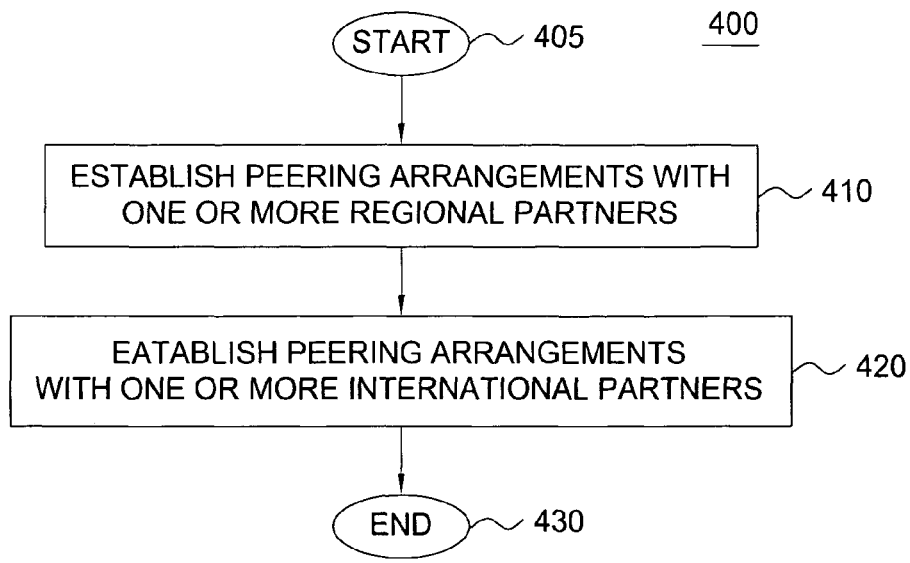
FIG. 4 illustrates a flowchart of a method for establishing peering arrangements with one or more partner VoIP networks of the present invention.

FIG. 4 illustrates a flowchart of a method for establishing peering arrangements with one or more partner VoIP networks. Method 400 starts in step 405 and proceeds to step 410.

In step 410, the method establishes peering arrangements with one or more regional partners. IP peering is an arrangement that allows two or more IP carriers to be interconnected so that IP packets originating in one carrier can be terminated in another carrier's network. For this step, in an IP peering arrangement, regional VoIP carriers (e.g., domestic networks within a single country) can hand off calls to regional partner VoIP carriers using IP networks, instead of PSTN, to allow the calls to be completed in the terminating carrier's network.

In step 420, the method establishes peering arrangements with one or more international partners. For this step, in an IP peering arrangement, international VoIP carriers (between two countries) can hand off calls to international partner VoIP carriers using IP networks, to allow the calls to be completed in the terminating carrier's network. The method ends in step 430.

Figure 5:
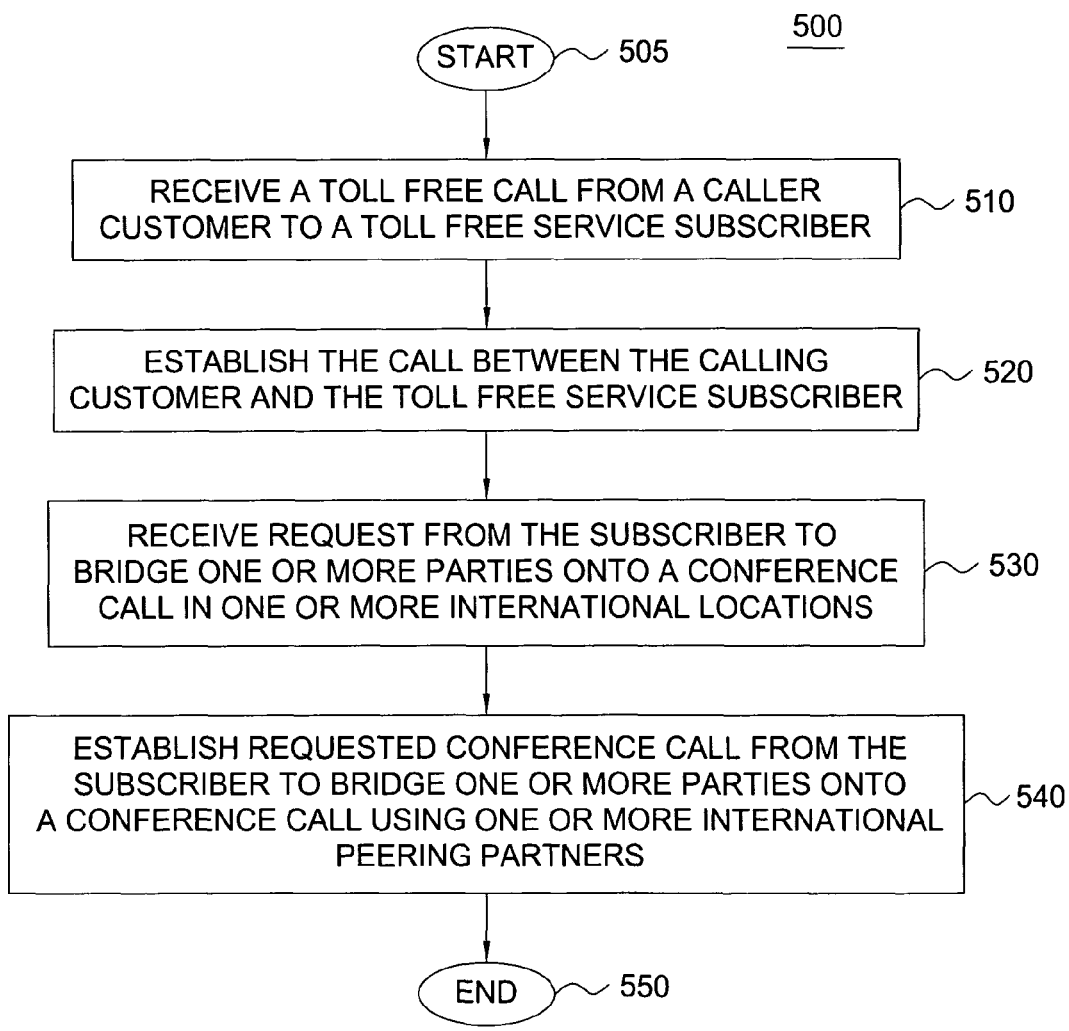
FIG. 5 illustrates a flowchart of a method for enabling a multi-agent international toll free call using peering arrangements in a VoIP network of the present invention.

FIG. 5 illustrates a flowchart of a method for enabling an international toll free call using peering arrangements in a VoIP network. Method 500 starts in step 505 and proceeds to step 510.

In step 510, the method receives a toll free call from a calling customer to a toll free service subscriber within the network. In step 520, the method establishes a two way call between the calling customer and the called toll free service subscriber. In step 530, the method receives a request from the toll free service subscriber to bridge one or more parties in one or more international locations onto a multiple party conference call. In step 540, the method establishes the requested conference call to bridge all requested parties onto the call using one or more international network peering partners. The method uses a Border Element or a Peering Border Element to bridge the existing media path with a newly added call leg connecting to the Media Server. The Media Server in turn bridges the call leg connecting to the existing media path to all other call legs connecting to one or more newly added parties requested by the toll free service subscriber. The method ends in step 550.

Figure 6:
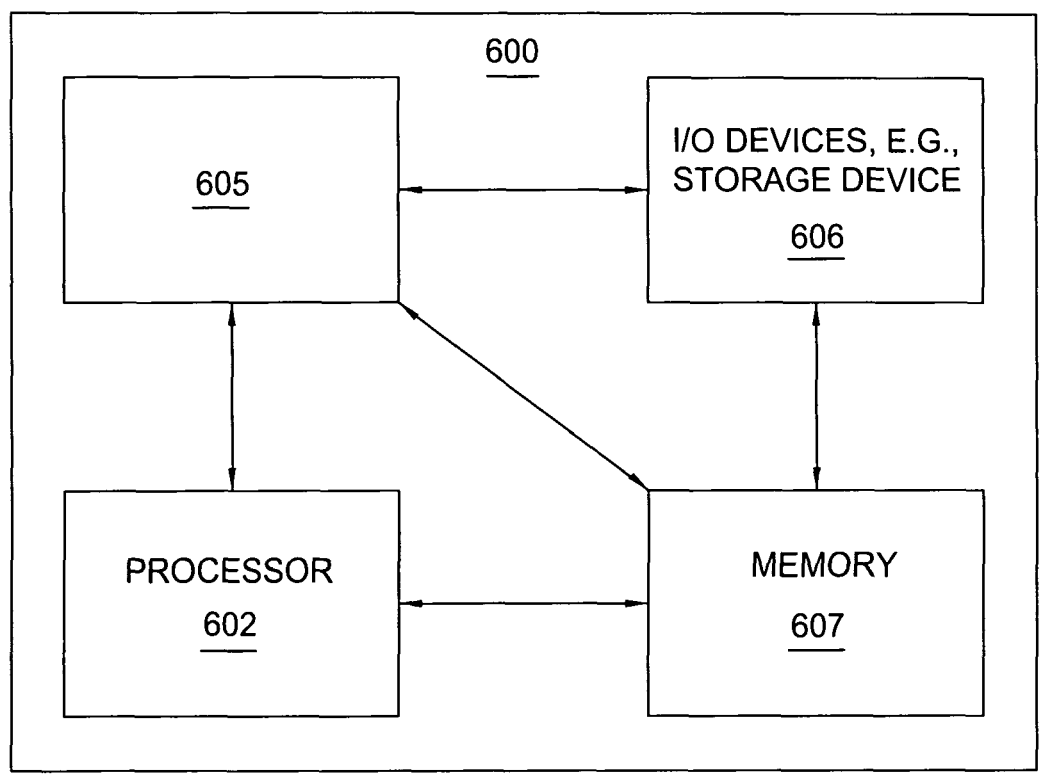
FIG. 6 illustrates a high level block diagram of a general purpose computer suitable for use in performing the functions described herein.

FIG. 6 depicts a high level block diagram of a general purpose computer suitable for use in performing the functions described herein. As depicted in FIG. 6, the system 600 comprises a processor element 602 (e.g., a CPU), a memory 604, e.g., random access memory (RAM) and/or read only memory (ROM), an international toll free call module 605, and various input/output devices 606 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present international toll free call module or process 605 can be loaded into memory 604 and executed by processor 602 to implement the functions as discussed above. As such, the present international toll free call process 605 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing international toll free calls using peering arrangements, comprising:
   receiving a toll free number call setup message in a terminating carrier network from an originating carrier network;
   processing the toll free number call setup message between the originating carrier network to the terminating carrier network via a first peering arrangement to establish a call between a calling party and a called party; and
   bridging a third party from an international carrier network to the call via a second peering arrangement to establish a multi-party conference call, wherein the bridging is performed by a border element, wherein the bridging comprises bridging an existing media path of the call to a call leg connecting to a media server that further bridges the third party, wherein the originating carrier network, the terminating carrier network and the international carrier network are internet protocol networks.

2. The method of claim 1, wherein the internet protocol networks are voice over internet protocol networks.

3. The method of claim 1, wherein the originating carrier network and the terminating carrier network are domestic networks.

4. The method of claim 1, wherein the existing media path of the call is bridged with the call leg connecting to the media server by a border element of the terminating carrier network.

5. A non-transitory computer-readable medium having stored thereon a plurality of instructions, the plurality of instructions including instructions which, when executed by a processor, cause the processor to perform a method for providing international toll free calls using peering arrangements, comprising:
   receiving a toll free number call setup message in a terminating carrier network from an originating carrier network;
   processing the toll free number call setup message between the originating carrier network to the terminating carrier network via a first peering arrangement to establish a call between a calling party and a called party; and
   bridging a third party from an international carrier network to the call via a second peering arrangement to establish a multi-party conference call, wherein the bridging comprises bridging an existing media path of the call to a call leg connecting to a media server that further bridges the third party, wherein the originating carrier network, the terminating carrier network and the international carrier network are internet protocol networks.

6. The non-transitory computer-readable medium of claim 5, wherein the internet protocol networks are voice over internet protocol networks.

7. The non-transitory computer-readable medium of claim 5, wherein the originating carrier network and the terminating carrier network are domestic networks.

8. The non-transitory computer-readable medium of claim 5, wherein the existing media path of the call is bridged with the call leg connecting to the media server by a border element of the terminating carrier network.

9. A system for providing international toll free calls using peering arrangements, comprising:
   means for receiving a toll free number call setup message in a terminating carrier network from an originating carrier network;
   means for processing the toll free number call setup message between the originating carrier network to the terminating carrier network via a first peering arrangement to establish a call between a calling party and a called party; and
   means for bridging a third party from an international carrier network to the call via a second peering arrangement to establish a multi-party conference call, wherein the bridging means comprises means for bridging an existing media path of the call to a call leg connecting to a media server that further bridges the third party, wherein the originating carrier network, the terminating carrier network and the international carrier network are Internet protocol networks.

10. The system of claim 9, wherein the internet protocol networks are voice over Internet protocol networks.

11. The system of claim 9, wherein the originating carrier network and the terminating carrier network are domestic networks.

12. The system of claim 9, wherein the existing media path of the call is bridged with the call leg connecting to the media server by a border element of the terminating carrier network.

* * * * *